(No Model.)
L. GRIESER.
Corn Planter.
No. 229,696. Patented July 6, 1880.
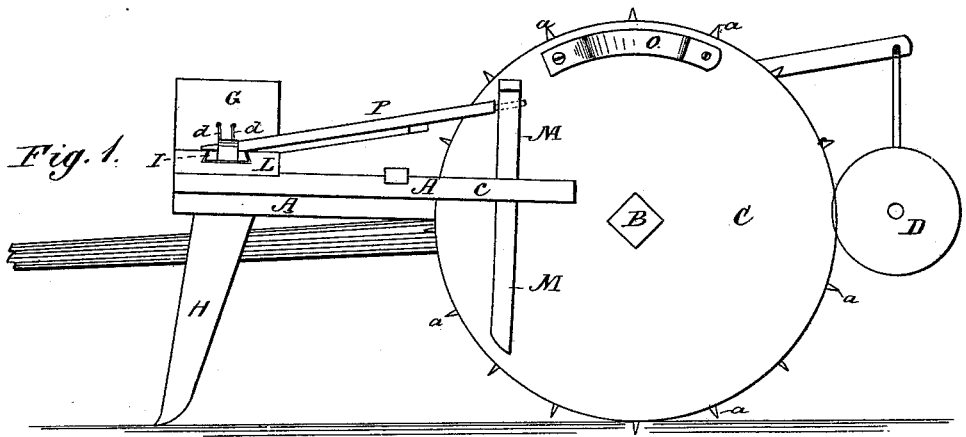
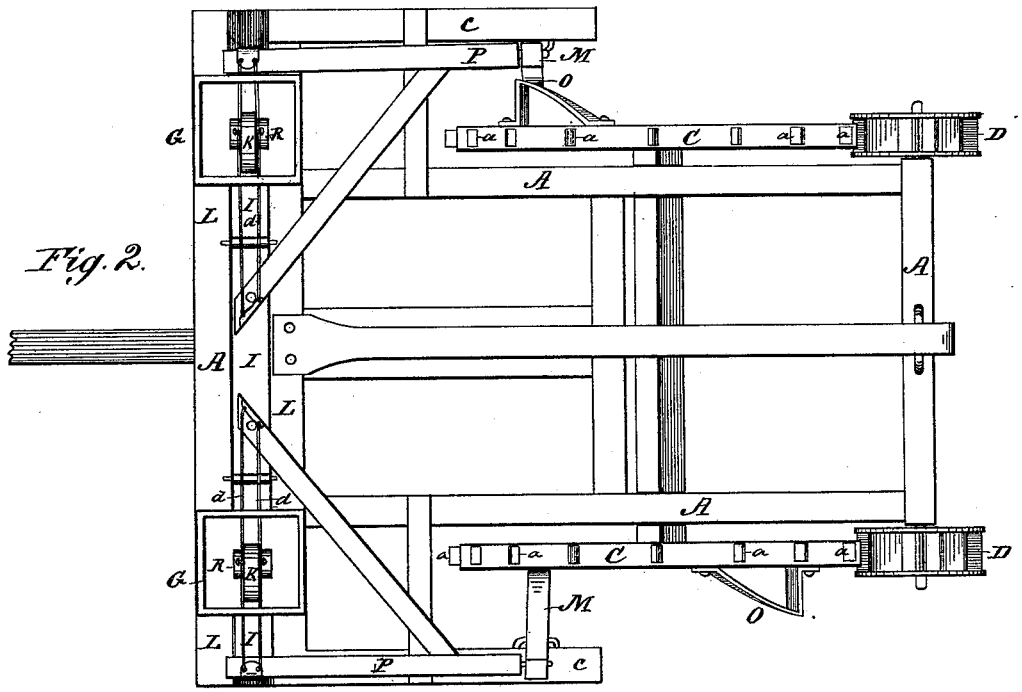
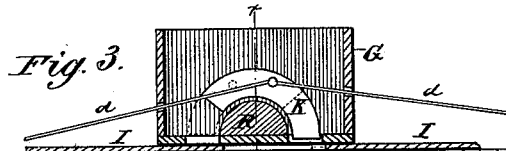
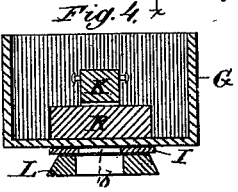
WITNESSES:
W. W. Hollingsworth
John R. Kenon
INVENTOR:
L. Grieser
BY
ATTORNEYS.

UNITED STATES PATENT OFFICE.

LEONHARD GRIESER, OF MINONK, ILLINOIS.

CORN-PLANTER.

SPECIFICATION forming part of Letters Patent No. 229,696, dated July 6, 1880.

Application filed March 31, 1880. (No model.)

*To all whom it may concern:*

Be it known that I, LEONHARD GRIESER, of Minonk, in the county of Woodford and State of Illinois, have invented a new and useful Improvement in Corn-Planters; and I do hereby declare that the following is a full, clear, and exact description of the same.

My invention is an improvement in the class of planters having reciprocating seed-slides, with which auxiliary devices are combined to assist in regulating the discharge of seed.

The invention consists, mainly, in the employment of a curved reciprocating block or bar, which is located in the hopper and attached to the seed-slide, with which it reciprocates simultaneously, so as to alternately open and close one of its two adjacent openings, and thereby alternately permit and prevent the escape of seed through said openings, as hereinafter described and claimed.

In accompanying drawings, forming part of this specification, Figure 1 is a side view of my improved machine. Fig. 2 is a plan view. Fig. 3 is a detail sectional view. Fig. 4 is a cross-section on line $x\ x$, Fig. 3.

The frame A of the machine is mounted on an axle, B, which rotates with the two transporting-wheels C, fixed thereon. Said wheels are provided with fixed peripheral teeth $a$, which take into the soil and prevent slipping. In rear of the transporting-wheels C are placed the wheels D, which are formed of parallel vertical disks connected by radial plates or cross-bars. Said wheels D are rotated by contact with the periphery of the transporting-wheels C or their teeth $c$. The wheels D thus serve to remove the mud or adhering soil from said transporting-wheels, so that the teeth $c$ cannot fail to take into the ground.

The planting mechanism is attached to the front end of the frame A. It consists, mainly, of seed hoppers or receptacles G, drill-teeth or furrow-openers H, a reciprocating seed-slide, I, and devices K, which latter are located in the hoppers and have a circular reciprocating movement, and whose function is to alternately cut off and aid the discharge of seed from the hopper into the seed-spout, by which it is conveyed into the furrow. Each hopper G is placed a short distance in front of each transporting-wheel C, and permanently secured to the transverse grooved ways L, in which the seed-slide is arranged to reciprocate. There are two seed-discharge openings, $b$, Fig. 3, in the bottom of each hopper, which register with an opening or openings in the seed-slide I as the latter moves to and fro. Such movement of the slide is effected by the levers M and cams O, the former, M, being pivoted at their upper ends to the rearwardly-projecting arms P of the seed-slide, and at about the middle of their length to parts $c$ of the frame A, while the cams O are attached to the wheels C, so that as they rotate by friction with the ground the cams O strike the lower ends of the levers M and force them outward, the levers being thereby oscillated on their fulcra and caused to operate the seed-slide.

The cams O are necessarily so located on the respective wheels C as to act in succession, but at regular intervals.

The seed-stop K is pivoted at the middle of its length to parallel wires, which are secured to the seed-slide I and pass through holes in the sides of the hopper; hence as the seed-slide reciprocates the seed-stop K partakes of its movement, and has also a vibrating motion by reason of contact with the fixed abutment R, on whose convex side it slides back and forth. In other words, the abutment R, being fixed, causes the device K to turn on its pivot each time it shifts back and forth along with the slide I.

When the parts are in the position shown in Fig. 3 the seed in the hopper enters and fills the left-hand opening $b$ in the hopper-bottom, and at the same time the device K is forcing the seed out of the right-hand opening $b$, so that it will be caused to fall into the spout, (not shown,) and thus find its way into the furrow. When the slide I and device K shift to the left, or into the opposite position, the seed which fills such left-hand opening $b$ will fall or be forced out and a like quantity of seed will enter the right-hand opening $b$. The device K thus serves to force out or insure the discharge of seed from the openings $b$ $b$ alternately, and also prevents escape of an undue quantity.

What I claim as new is—

In a corn-planter, the combination of the curved segmental seed-stop K, the wires to which it is pivoted centrally, the fixed abutment R, the hopper G, having a seed-opening, $b$, on each side of said abutment, and the seed-slide having an opening, as specified.

LEONHARD GRIESER.

Witnesses:
MARTIN L. NEWELL,
H. T. WEBBER,
JAMES McCOY.